United States Patent
Simonetti et al.

(10) Patent No.: US 10,569,892 B2
(45) Date of Patent: Feb. 25, 2020

(54) SUPPLEMENTAL POWER FOR REDUCTION OF PRIME MOVER

(71) Applicant: Sikorsky Aircraft Corporation, Stratford, CT (US)

(72) Inventors: Joseph Lawrence Simonetti, Southbury, CT (US); Mark Denton Bystry, Stratford, CT (US); Michael Joseph DeVita, Cos Cob, CT (US); Matthew J. Tarascio, Millford, CT (US); Michael Peter Strauss, New Haven, CT (US); Hayden M. Reeve, West hartford, CT (US); Niranjan Desai, Broad Brook, CT (US); Brian St. Rock, Andover, CT (US); Charles E. Lents, Amston, CT (US); Lawrence E. Zeidner, West Hartford, CT (US); Alfred Russell Smiley, Marlborough, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 130 days.

(21) Appl. No.: 14/889,691

(22) PCT Filed: May 5, 2014

(86) PCT No.: PCT/US2014/036791
§ 371 (c)(1),
(2) Date: Nov. 6, 2015

(87) PCT Pub. No.: WO2014/182616
PCT Pub. Date: Nov. 13, 2014

(65) Prior Publication Data
US 2016/0083104 A1    Mar. 24, 2016

Related U.S. Application Data

(60) Provisional application No. 61/819,867, filed on May 6, 2013.

(51) Int. Cl.
*B64D 31/12* (2006.01)
*B64F 5/00* (2017.01)
(Continued)

(52) U.S. Cl.
CPC ............. *B64D 31/12* (2013.01); *B64D 27/02* (2013.01); *B64D 41/00* (2013.01); *B64F 5/00* (2013.01);
(Continued)

(58) Field of Classification Search
CPC ........ B64D 31/00; B64D 31/06; B64D 31/08; B64D 31/10; B64D 31/12; B64D 33/00;
(Continued)

(56) References Cited

U.S. PATENT DOCUMENTS 4,862,009 A * 8/1989 King ..................... F02N 11/04
290/22
4,955,560 A * 9/1990 Nishina ................. B64D 27/24
244/53 R (Continued)

FOREIGN PATENT DOCUMENTS

DE   102010021025 A1   11/2011
EP   2548803 A1        1/2013
GB   2489311 A         9/2012

OTHER PUBLICATIONS

International Search Report and Written Opinion regarding related PCT Case No. PCT/US2014/036791; dated Jan. 12, 2015; 12 pages.
(Continued)

Primary Examiner — Thomas G Black
Assistant Examiner — Sara J Lewandroski
(74) Attorney, Agent, or Firm — Cantor Colburn LLP (57) ABSTRACT

Embodiments are directed to selecting, by a computing device comprising a processor, the size of at least one prime mover associated with an aircraft to satisfy a baseline power
(Continued)

requirement for operation of the aircraft during a steady state load condition, selecting at least one power source configuration to supplement power provided by the at least one prime mover during a transient load condition associated with the operation of the aircraft, and selecting, by the computing device, a parameter of the at least one power source configuration to provide a total power in an amount that is greater than a threshold during the transient condition.

18 Claims, 8 Drawing Sheets

(51) Int. Cl.
    *B64D 41/00*    (2006.01)
    *B64D 27/02*    (2006.01)
(52) U.S. Cl.
    CPC .... *B64D 2027/026* (2013.01); *B64D 2221/00* (2013.01); *Y02T 50/44* (2013.01); *Y02T 50/64* (2013.01); *Y02T 90/44* (2013.01)
(58) Field of Classification Search
    CPC .. B64D 27/00; B64D 27/02; B64D 2027/026; B64D 41/00; B64D 2221/00; Y02T 50/60; Y02T 50/62; Y02T 50/64
    See application file for complete search history.

(56) References Cited

U.S. PATENT DOCUMENTS

| | | | | |
|---|---|---|---|---|
| 5,623,197 | A * | 4/1997 | Roseman | H02J 7/1453 320/134 |
| 6,134,875 | A * | 10/2000 | Massey | F02C 7/26 60/788 |
| 6,347,507 | B1 | 2/2002 | Lawlor | |
| 6,992,403 | B1 * | 1/2006 | Raad | F02C 7/275 290/10 |
| 2008/0006739 | A1 | 1/2008 | Mochida | |
| 2008/0211309 | A1 * | 9/2008 | Nolte | H02J 7/0045 307/66 |
| 2008/0258014 | A1 * | 10/2008 | McCoskey | B60L 7/10 244/221 |
| 2009/0111635 | A1 * | 4/2009 | Conlon | B60K 6/26 475/5 |
| 2009/0114197 | A1 | 5/2009 | Darnell | |
| 2009/0302153 | A1 * | 12/2009 | Matasso | H02J 1/10 244/99.2 |
| 2010/0013223 | A1 | 1/2010 | Certain | |
| 2010/0038473 | A1 * | 2/2010 | Schneider | B64D 27/24 244/60 |
| 2010/0049475 | A1 | 2/2010 | Cazals | |
| 2010/0064689 | A1 * | 3/2010 | Reinhardt | B64D 27/24 60/706 |
| 2010/0156171 | A1 * | 6/2010 | Sechrist | H02J 1/08 307/9.1 |
| 2010/0251726 | A1 * | 10/2010 | Jones | F02C 7/32 60/773 |
| 2012/0068006 | A1 * | 3/2012 | Jones | B64C 27/02 244/17.15 |
| 2012/0209456 | A1 * | 8/2012 | Harmon | B64C 39/024 701/3 |
| 2012/0234968 | A1 * | 9/2012 | Smith | B64C 29/0033 244/12.3 |
| 2013/0139522 | A1 * | 6/2013 | Haillot | F02C 9/18 60/785 |
| 2013/0151039 | A1 | 6/2013 | Haillot | |
| 2013/0154357 | A1 * | 6/2013 | Schult | B60R 16/03 307/9.1 |
| 2014/0010652 | A1 * | 1/2014 | Suntharalingam | B64D 27/02 416/1 |
| 2014/0034781 | A1 * | 2/2014 | Kouros | B64C 27/12 244/60 |
| 2014/0054411 | A1 * | 2/2014 | Connaulte | B64C 27/006 244/17.13 |
| 2014/0117148 | A1 * | 5/2014 | Dyrla | B64C 27/14 244/17.13 |
| 2014/0125121 | A1 * | 5/2014 | Edwards | H02J 7/1446 307/9.1 |
| 2014/0126096 | A1 * | 5/2014 | Luecken | H02H 3/24 361/86 |
| 2014/0159365 | A1 * | 6/2014 | Algrain | H02J 3/32 290/7 |
| 2014/0175886 | A1 * | 6/2014 | Kwok | H02J 7/34 307/46 |
| 2014/0283519 | A1 * | 9/2014 | Mariotto | F02C 7/36 60/698 |
| 2014/0360205 | A1 * | 12/2014 | French | F01D 15/10 60/786 |
| 2014/0367525 | A1 * | 12/2014 | Salyer | B64C 27/04 244/53 R |
| 2015/0014475 | A1 * | 1/2015 | Taylor | B64C 39/024 244/6 |
| 2015/0014479 | A1 * | 1/2015 | Bayliss | H02J 4/00 244/58 |
| 2015/0130186 | A1 * | 5/2015 | Vieillard | B64D 27/24 290/31 |
| 2015/0143950 | A1 * | 5/2015 | Bedrine | B64C 27/04 74/661 |
| 2015/0285165 | A1 * | 10/2015 | Steinwandel | B64D 27/02 244/55 |
| 2015/0364780 | A1 * | 12/2015 | Libis | H01M 8/04955 429/418 |
| 2016/0083106 | A1 * | 3/2016 | Lebrun | B64D 41/00 290/7 |
| 2016/0204615 | A1 * | 7/2016 | Radun | H02J 7/345 307/9.1 |

OTHER PUBLICATIONS

EP Communication; Extended European Search Report; Application No. 14794198.3-1754/2994386 PCT/US2014036791; dated Apr. 12, 2017; pp. 1-9.
PCT International Preliminary Report on Patentability; International Application No. PCT/US2014/036791; International Filing Date: May 5, 2014; dated Nov. 10, 2015; pp. 1-6.
Invitation to Pay Additional Fees and, Where Applicable, Protest Fee; International Application No. PCT/US2014/036791; International Filing Date: May 5, 2014; dated Aug. 25, 2014; 2 Pages.

* cited by examiner

SUPPLEMENTAL POWER FOR REDUCTION OF PRIME MOVER

CROSS REFERENCE TO RELATED APPLICATIONS

This is a national stage of PCT Application No. PCT/US2014/036791 filed May 5, 2014, which claims priority to U.S. Provisional Application No. 61/819,867, filed May 6, 2013, both of which are incorporated herein by reference in their entirety.

BACKGROUND

One or more prime movers used in a given application or system environment may be sized to provide power to support the greatest load that may be encountered during operation. For example, in connection with an aircraft (e.g., an airplane or helicopter) that includes two engines or turbines, each of the engines may be sized for worst-case loads to support the aircraft on its own for a short period of time in order to provide for safe operation.

Sizing an engine to support worst-case loads adversely impacts fuel efficiency for other power conditions. For example, sizing an engine for emergency conditions results in sub-optimal specific fuel consumption during cruise operation, increasing the amount of fuel consumption per unit of power produced. An engine will operate at significantly reduced fuel efficiency relative to the engine's optimum capability for the majority of its operating life.

BRIEF SUMMARY

An embodiment of the disclosure is directed to a method comprising: selecting, by a computing device comprising a processor, the size of at least one prime mover associated with an aircraft to satisfy a baseline power requirement for operation of the aircraft during a steady state load condition, selecting at least one power source configuration to supplement power provided by the at least one prime mover during a transient load condition associated with the operation of the aircraft, and selecting, by the computing device, a parameter of the at least one power source configuration to provide a total power in an amount that is greater than a threshold during the transient condition.

An embodiment of the disclosure is directed to a system comprising: a plurality of thermal engines configured to serve as primary movers of at least one rotor associated with an aircraft, wherein a size of the thermal engines are selected to satisfy a baseline power requirement for operation of the aircraft during a steady state load condition, a motor-generator configured to conditionally drive the at least one rotor during a transient load condition, and a controller configured to cause a battery to provide electrical power to the motor-generator during the transient load condition and to charge the battery during the steady state load condition.

An embodiment of the disclosure is directed to a system comprising: a first and a second thermal engine configured to serve as primary movers of at least one rotor associated with an aircraft, wherein a size of the first and second thermal engines are selected to satisfy a baseline power requirement for operation of the aircraft during a steady state load condition, and a heat engine configured to conditionally drive the at least one rotor during a transient load condition.

An embodiment of the disclosure is directed to a system comprising: a plurality of thermal engines configured to serve as primary movers of at least one rotor associated with an aircraft, wherein a size of the first and second thermal engines are selected to satisfy a baseline power requirement for operation of the aircraft during a steady state load condition, and a supplemental power source configured to provide at least one fuel additive to at least one of the first and second thermal engines during a transient load condition.

Additional embodiments are described below.

BRIEF DESCRIPTION OF THE DRAWINGS

The present disclosure is illustrated by way of example and not limited in the accompanying figures in which like reference numerals indicate similar elements.

DETAILED DESCRIPTION

It is noted that various connections are set forth between elements in the following description and in the drawings (the contents of which are included in this disclosure by way of reference). It is noted that these connections in general and, unless specified otherwise, may be direct or indirect and that this specification is not intended to be limiting in this respect. In this respect, a coupling between entities may refer to either a direct or an indirect connection.

Exemplary embodiments of apparatuses, systems, and methods are described for providing power management. In some embodiments a prime mover (e.g., a thermal engine, such as a Brayton cycle engine, an Otto cycle engine, a Diesel cycle engine, etc.) may be sized such that the prime mover provides power to support a constant base load. For example, in connection with an aircraft, the prime mover may be sized to support operation of the aircraft in cruise, with potential additional margin for safety, reliability, or efficiency reasons. Transient energy and power loads, which may be a result of a one engine inoperative (OH) condition, maneuverability, or other transient demands, may be met by a supplemental power source. The energy source for the supplemental power source may take one or more forms, such as an electrical storage system or a fuel storage system.

Figure 1:
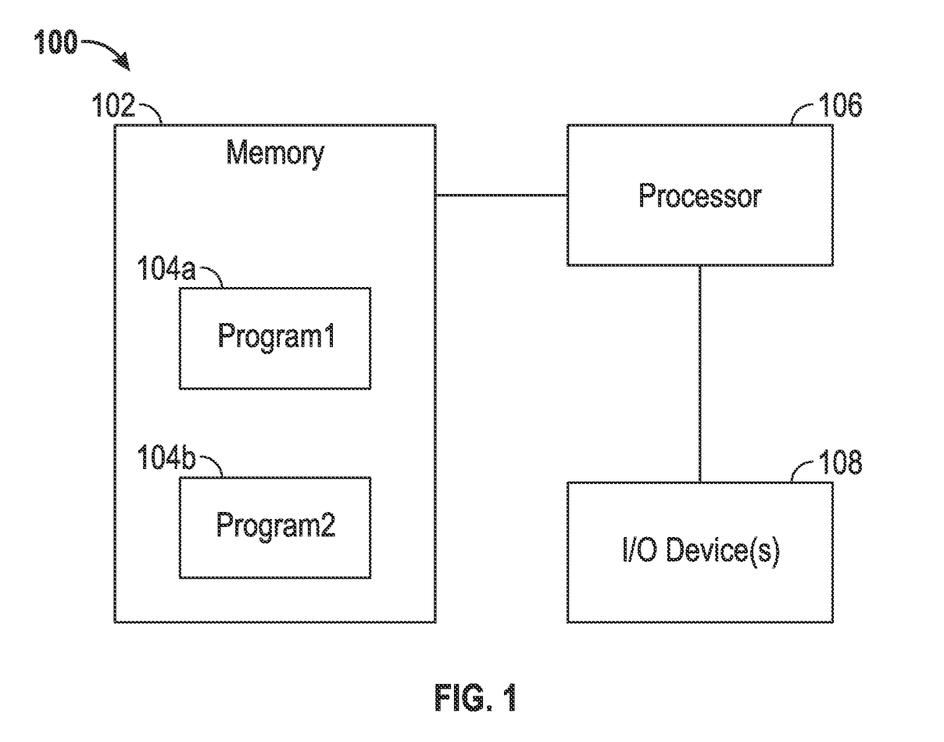
FIG. 1 is a schematic block diagram illustrating an exemplary computing system in accordance with one or more embodiments.

Referring to FIG. 1, an exemplary computing system 100 is shown. The system 100 is shown as including a memory 102. The memory 102 may store executable instructions. The executable instructions may be stored or organized in any manner and at any level of abstraction, such as in connection with one or more processes, routines, procedures, methods, etc. As an example, at least a portion of the instructions are shown in FIG. 1 as being associated with a first program 104a and a second program 104b.

The instructions stored in the memory 102 may be executed by one or more processors, such as a processor 106. The processor 106 may be coupled to one or more input/output (I/O) devices 108. In some embodiments, the I/O device(s) 108 may include one or more of a keyboard or keypad, a touchscreen or touch panel, a display screen, a microphone, a speaker, a mouse, a button, a remote control, a joystick, a printer, a telephone or mobile device (e.g., a smartphone), etc. The I/O device(s) 108 may be configured to provide an interface to allow a user to interact with the system 100.

The system 100 is illustrative. In some embodiments, one or more of the entities may be optional. In some embodiments, additional entities not shown may be included. For example, in some embodiments the system 100 may be associated with one or more networks. In some embodiments, the entities may be arranged or organized in a manner different from what is shown in FIG. 1. One or more of the entities shown in FIG. 1 may be associated with one or more of the devices or entities described herein.

Figure 2:
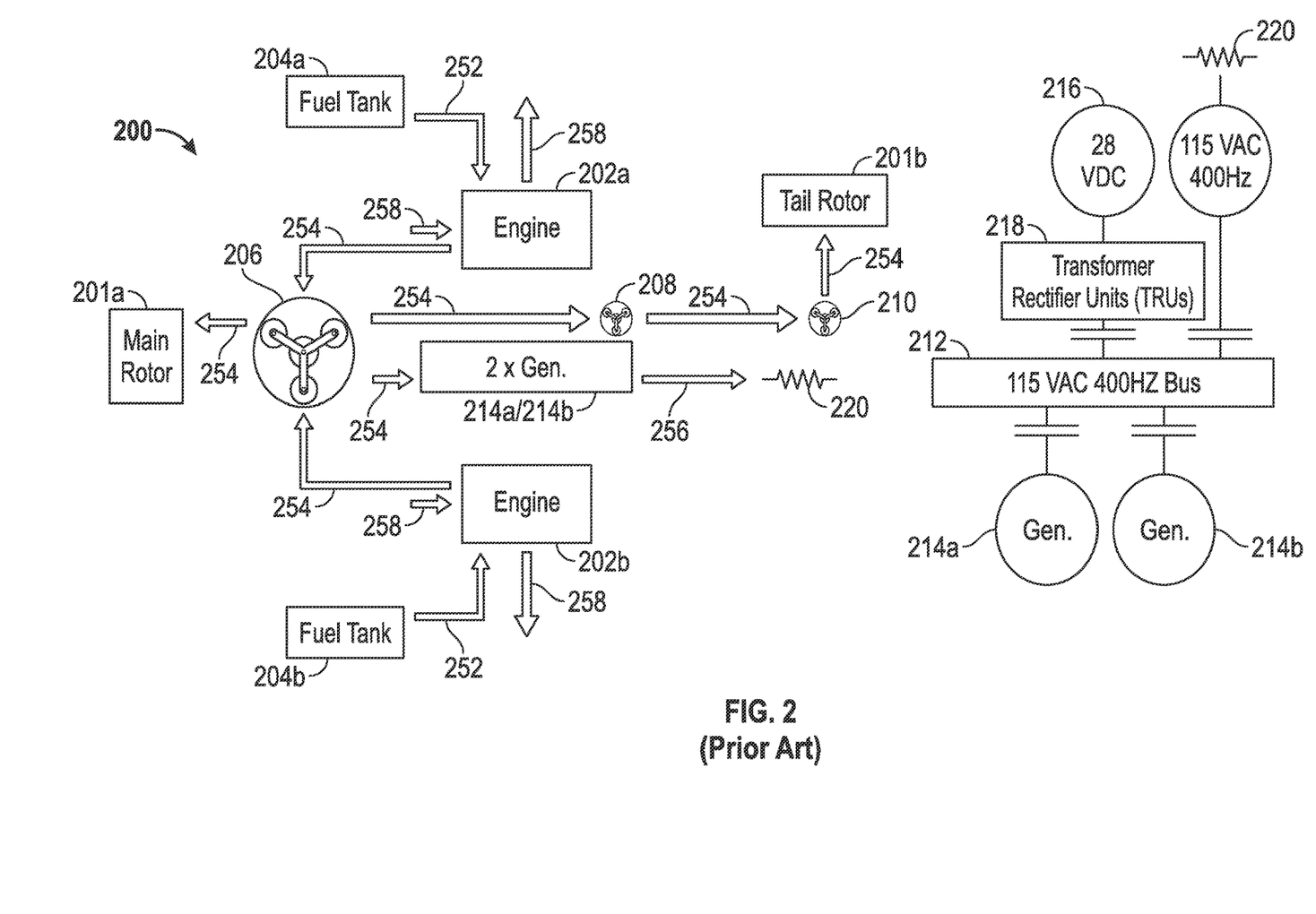
FIG. 2 illustrates a propulsion system in accordance with the prior art.

FIG. 2 illustrates a propulsion system 200 in accordance with the prior art. As shown, aircraft power may be provided from thermal engines 202a and 202b. The thermal engines 202a and 202b may receive input fuel from fuel tanks 204a and 204b, respectively. The thermal engines 202a and 202b may supply mechanical energy to a main rotor gearbox 206. One or more additional gearboxes, such as gearboxes 208 and 210, may be used to transmit mechanical power from the main gearbox 206 to the main rotor 201a and tail rotor 201b.

The electrical power system may include a 115 VAC 400 Hz bus 212 sourced by one or more generators 214, such as 35 kVA generators 214a and 214b. The generators 214a and 214b may be mounted on an accessory gearbox 208 (e.g., an additional gear center on the main gearbox 206) and may be driven by a main gearbox 206 during normal flight. The generators may provide power to a 115 VAC 400 Hz bus 212, which supports one or more aircraft AC electric loads 220, and may supply power to a 28 VDC subsystem 216, through two 250 amp 28 VDC Transformer-Rectifier Units (TRUs) 218.

As shown in FIG. 2, fuel flow may be indicated by arrows 252, shaft power may be indicated by arrows 254, electrical energy may be indicated by arrows 256, and air flow may be indicated by arrows 258.

Figure 3A:
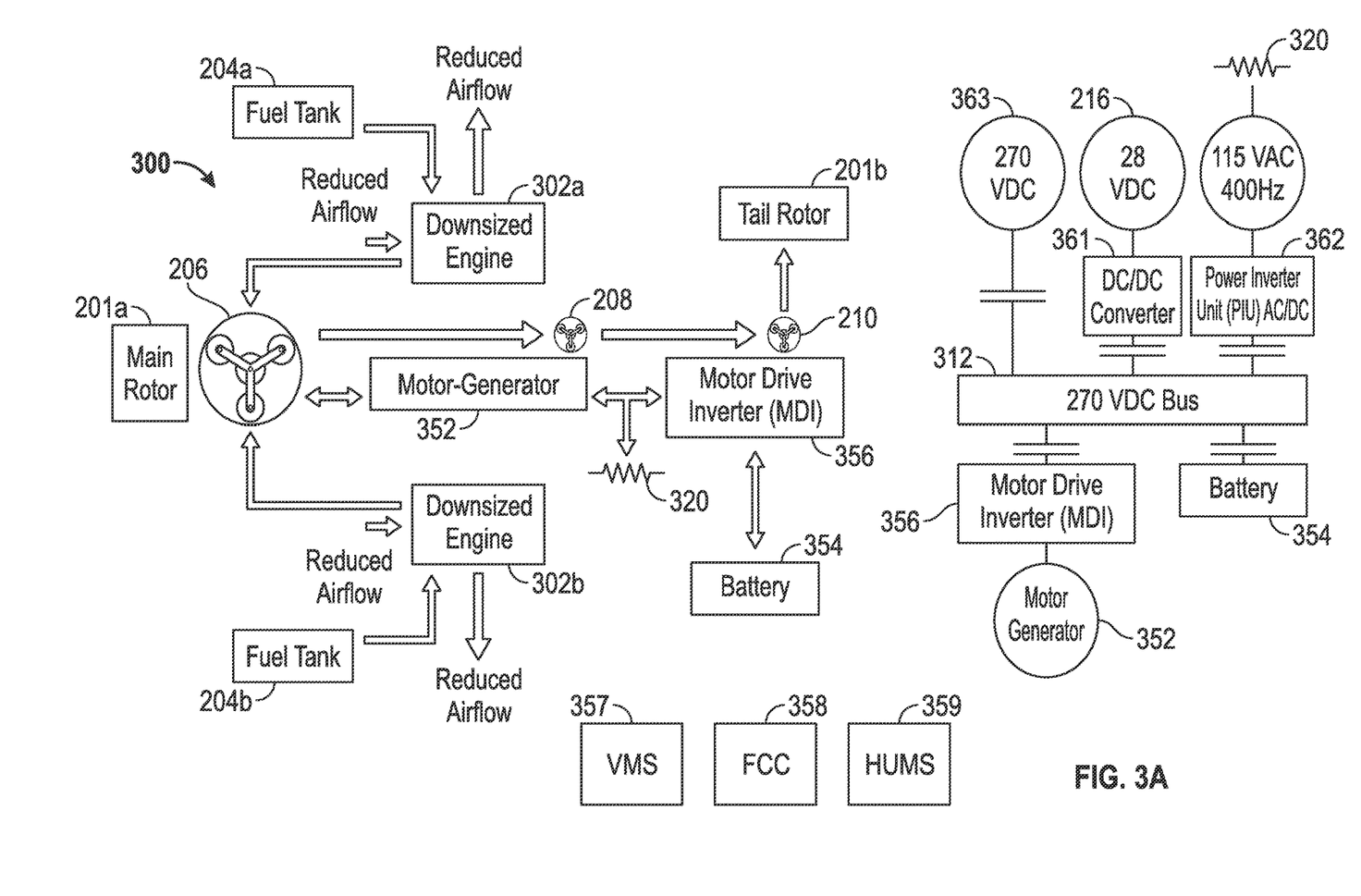
FIG. 3A illustrates an exemplary propulsion system incorporating supplemental electrical power in accordance with one or more embodiments.

Turning now to FIG. 3A, a propulsion system 300 in accordance with one or more embodiments is shown. The system 300 includes many of the same components described above in connection with the system 200, and so a complete re-description is omitted for the sake of brevity. Furthermore, a number of details in common between FIGS. 2 and 3A have been omitted from FIG. 3A for purposes of clarity in illustration and explanation. The system 300 may include thermal engines 302a and 302b. The thermal engines 302a and 302b may provide primary aircraft power.

The thermal engines 302a and 302b may be downsized as smaller versions of the thermal engines 202a and 202b, such that the thermal engines 302a and 302b may have a lower power capacity relative to the thermal engines 202a and 202b. To supplement the power that may have been sacrificed as a result of a size reduction in the engines 302a and 302b, a battery-powered motor-generator 352 may be affixed to an additional gear center on the main gearbox 206.

The motor-generator 352 may augment the base power load during transient power conditions. At low power, non-transient or steady state conditions, the system may operate in a similar manor to the prior art system 200 with the exception of energy storage through a 270 VDC bus 312. The prime mover (e.g., the thermal engines 302 and 302b) may be used to drive the motor-generator 352 through the accessory gearbox 208 (as in the prior art 200 system) which may source a 270 VDC electric bus 312 through a Motor-Drive Inverter (MDI) 356. The Motor-Drive Inverter (MDI) 356 may serve as distribution point for multiple sources of electrical power. In exemplary embodiments, the Motor-Drive Inverter (MDI) 356 can receive AC electrical energy from the motor-generator 352, condition the respective power signals (if necessary) and output electrical energy to a battery bank 354, under the control of the Vehicle Management System (VMS) 357. Conversely, the Motor-Drive Inverter (MDI) 356 can transmit DC electrical energy from the battery bank 354 and output AC electrical energy to the motor-generator 352, under the control of the Vehicle Management System (VMS) 357. It is understood that the Motor-Drive Inverter (MDI) 356 may be a universal power distributor, accepting both AC and DC sources of power and may contain a Power Inverter Unit (PIU) 362, which may convert the DC electrical power from the battery bank 354 to AC electrical power.

The 270 VDC electric bus 312 may source the aircraft electric loads, comprising the 28 VDC subsystem 216, sourced through a DC/DC converter 361 and, aircraft AC electric loads 220 sourced through a DC/AC inverter 362, and any 270 VDC loads 363, sourced directly. Unlike the prior art system 200, power in excess of that needed to supply the aircraft electric loads may be supplied to the motor/generator 352 from the prime mover (e.g., the thermal engines 302 and 302b) through the accessory gearbox 208 to (re)charge a battery or battery bank 354 connected to the 270 VDC bus 312.

During a high power, transient condition, the battery bank 354 may provide electric power or energy to the 270 VDC bus 312, which in turn may supply power to the aircraft electric loads (220, 216 and 363) and to the motor-generator 352 via motor drive/inverter 356, such that the motor-generator supplies power to the main rotor 201a in addition to the power provided by the prime mover (e.g., the thermal engines 302 and 302b).

The Vehicle Management System (VMS) 357 may be implemented using a microprocessor or microcontroller executing instructions and/or a computer program code to implement the processes described here. The Vehicle Management System (VMS) 357 may interface with one or more system components, such as the Motor-Drive Inverter (MDI) 356, a Flight Control Computer (FCC) 358, a vehicle Health and Usage Monitoring System (HUMS) 359, the battery bank 354, and the Power Inverter Unit (PIU) 362 to obtain status information and send control commands to these components.

The aircraft AC electrical load 320 may be analogous to the aircraft electrical load 220 of FIG. 2. The aircraft electrical load 320, the 28 VDC subsystem 216, and the 270 VDC loads 363 may include a fault isolation mechanism to ensure that the battery bank 354 continues to provide power to the motor-generator 352 should a short occur in the aircraft electrical load 220, 216 or 363.

In some embodiments, one or more energy management techniques may be deployed. For example, a net zero energy depletion (NZED) technique may be used, such that a base load power level is selected such that the battery bank 354 experiences no net change in energy depletion over the duration of a mission (e.g., any discharged battery energy during high power operations or transient conditions is replaced fully during low power operations/conditions).

In some embodiments, a net positive energy depletion (NPED) technique may be used, such that a capacity of the battery bank 354 at mission completion may be less than at mission start. In connection with an NPED technique, ground recharging may be performed to account for the energy depletion of the battery bank 354 during the mission. The ground recharging may be performed by operating a prime mover (e.g., thermal engines 302*a* and/or 302*b*) for a period of time post-mission or by use of a ground cart.

In some embodiments, a net negative energy depletion (NNED) technique may be used, such that a capacity of the battery bank 354 at mission completion may be greater than at mission start. NNED may be associated with an instance or scenario wherein excess energy is produced during the mission.

A number of features may be realized via the system 300, relative to the system 200. For example, one or more of: reduced drag, reduced fuel consumption, reduced emissions, reduced weight, reduced Direct Operation Cost (DOC) and Direct Maintenance Cost (DMC), greater safety, and greater performance may be realized via the system 300.

Figure 3B:
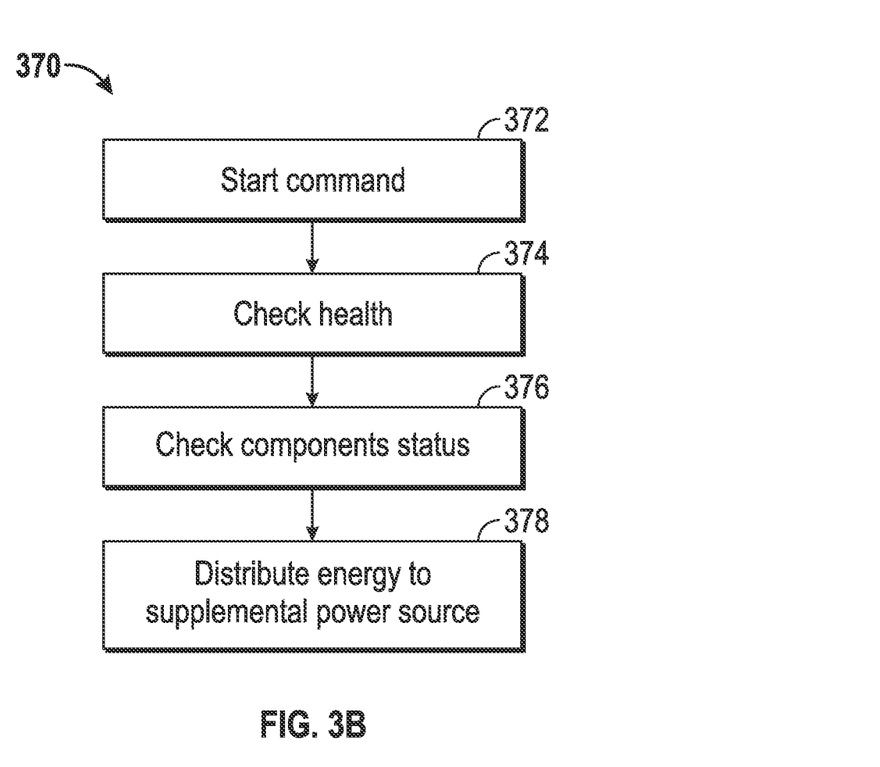
FIG. 3B illustrates a flow chart of an exemplary method in accordance with one or more embodiments.

FIG. 3B is a flowchart of an exemplary process 370 executed by the Vehicle Management System (VMS) 357 to provide supplemental power to the rotorcraft. The process 370 may begin at block 372 where the Vehicle Management System (VMS) 357 may receive a command to provide supplemental power to the main gearbox 206. This command may originate from the Flight Control Computer (FCC) 358 in response to a pilot command or a detected condition (e.g., some transient, non-steady-state power required, such as a maneuver or wind gust, etc.).

The process 370 may proceed to block 374 where the Vehicle Management System (VMS) 357 communicates with vehicle Health and Usage Monitoring System (HUMS) 359 to determine if there are any system components or conditions that may interfere with the process. At block 376, the Vehicle Management System (VMS) 357 may detect status of one or more system components, such as the battery bank 354, the motor-generator 352, and the Motor-Drive Inverter (MDI) 356.

At block 378 of the process 370, the Vehicle Management System (VMS) 357 may command the battery bank 354 to send electrical energy to the motor-generator 352, which then augments the power from the gas turbines, 302*a* and 302*b*, at the main gearbox 206. The process 370 may be executed in reverse to recharge the battery bank 354.

Figure 4A:
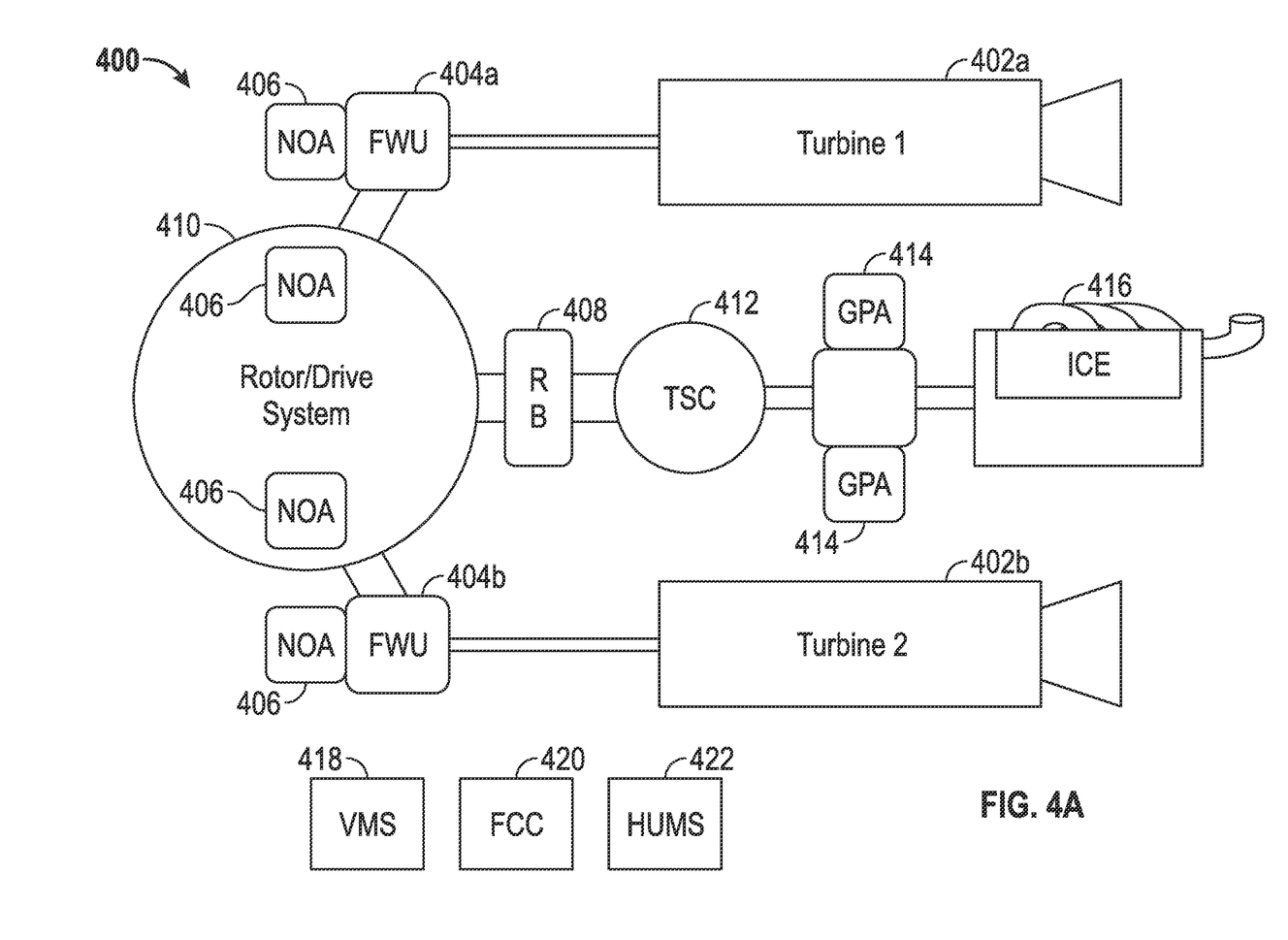
FIG. 4A illustrates an exemplary propulsion system incorporating a supplemental engine in accordance with one or more embodiments.

Turning now to FIG. 4A, a power train 400 in accordance with one or more embodiments is shown. The power train 400 may correspond to an application of a heat engine hybrid turbine power plant. A heat engine hybrid turbine power plant may comprise turbines 402*a* and 402*b* and thermal or heat engine 416. A power train 400 may also comprise a rotor/drive system 410.

The system 400 includes turbines 402*a* and 402*b*. The turbines 402*a* and 402*b* may correspond to prime movers in a given environment or application (e.g., an aircraft). The turbines 402*a* and 402*b* may correspond to, or be analogous to, the thermal engines 302*a* and 302*b* of FIG. 3A.

The system 400 may include Vehicle Management System (VMS) 418, Flight Control Computer (FCC) 420, and vehicle Health and Usage Monitoring System (HUMS) 422.

The system 400 may include free wheel units (FWUs) 404*a* and 404*b*. The FWUs 404*a* and 404*b* may correspond to one-way clutches that may be configured to provide for an auto rotation condition where the rotor/drive system 410 spins faster than the driving power turbines 402*a* and 402*b*. The FWUs 404*a* and 404*b* may be used to prevent a back-driving of the turbines 402*a* and 402*b*.

The system 400 may include one or more normal operating accessories (NOAs) 406. The NOAs 406 may be associated with accessory components or activities associated with an aircraft. For example, the NOAs 406 may include hydraulic pumps for flight controls, electric generators for generating electric power, etc.

The system 400 may include a rotor brake (RB) 408. The RB 408 may be coupled to a rotor/drive system 410 and may be configured to hold a rotor stationary when the RB 408 is engaged or allow for rotor operation/rotation when the RB 408 is disengaged. The rotor/drive system 410 may include one or more gear boxes and/or drive shafts.

The system 400 may include a torque slip clutch (TSC) 412. The TSC 412 may provide a function similar to that of an automobile torque converter. For example, the TSC 412 may enable mechanical slip between an thermal or heat engine 416 and a rotor/drive system 410 while a drive system is catching up to the engine speed. A torque slip device may be used to prevent overload or over speed of an engine.

The system 400 may include one or more ground power accessories (GPAs) 414. The GPAs 414 may be used as, or provide, auxiliary power before the turbines 402*a* and 402*b* are started. For example, the GPAs 414 may be used as, or include, a generator for providing electrical power to check instruments, to start an electric motor on the turbines 402*a* and 402*b*, etc.

The system 400 may include a thermal or heat engine 416. The heat engine 416 may correspond to an Otto cycle engine, a Diesel cycle engine, etc. The heat engine 416 may be used to provide power during off-optimum conditions of the prime mover, such that the system 400 operates at a higher efficiency in all modes of operations as compared to prior art.

The system 400 may operate in one or more modes. For example, in a first mode, the RB 408 may be engaged, the heat engine 416 may run the GPAs 414, and the turbines 402*a* and 402*b* might not be started. The first mode may be referred to as an auxiliary power unit (APU) mode.

The system 400 may operate in a second mode. In the second mode, the RB 408 may be engaged, the heat engine 416 may run the GPAs 414, and the turbines 402*a* and 402*b* may be started. The turbines 402*a* and 402*b* may be held stationary by the RB 408 in the second mode. The second mode may be referred to as a turbine startup mode.

The system 400 may operate in a third mode. In the third mode, the RB 408 may be disengaged, the heat engine 416 may run the GPAs 414, and the turbines 402*a* and 402*b* may drive the rotor/drive system 410 and the NOAs 406. The third mode may be referred to as a normal operating mode.

The system 400 may operate in a fourth mode. In the fourth mode, the RB 408 may be disengaged, the heat engine 416 may help drive the rotor/drive system 410, and the turbines 402*a* and 402*b* may drive the rotor/drive system 410 and the NOAs 406. The fourth mode may be referred to as a power boost mode.

The system 400 may operate in a fifth mode. In the fifth mode, the RB 408 may be disengaged, the heat engine 416 may help drive the rotor/drive system 410, a first of the turbines (e.g., turbine 402*a*) may be inoperative, and a second of the turbines (e.g., turbine 402*b*) may drive the rotor/drive system 410 and the NOAs 406. Optionally, any redundant GPA 414 functionality may be shutdown to reduce power consumption. The fifth mode may be referred to as a one engine inoperative (OEI) mode. The heat engine 416 may supply OEI related power to account for the inoperability of the first of the turbines in this mode.

In some embodiments, one or more cooling systems may be associated with one or more of the turbines 402a and 402b and/or the heat engine 416. For example, a cooling system may be implemented and sized to minimize weight (e.g., to provide for continuous use for supply of electric power) with an ability to cool for short durations at elevated power levels, including an ability to apply an evaporative cooling scheme under OEI conditions.

In some embodiments, the heat engine 416 may be operative in connection with the same type of fuel as the turbines 402a and 402b, thereby allowing a common fuel source to be used. In some embodiments, the turbines 402a and 402b may be sized for optimum cruise performance, potentially with no accessory power extraction, while the heat engine 416 could be configured to provide all electrical power.

Use of the system 400 may minimize or eliminate challenges associated with electrical power solutions. For example, electrical power solutions may require advanced electric motor and electric power storage systems that are not currently available or might be costly to fabricate/implement.

Figure 4B:
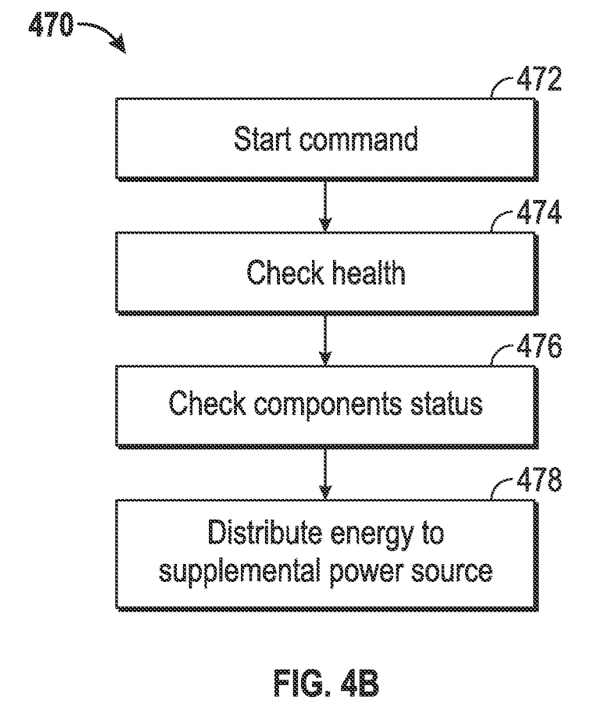
FIG. 4B illustrates a flow chart of an exemplary method in accordance with one or more embodiments.

FIG. 4B is a flowchart of an exemplary process 470 that may be executed by the Vehicle Management System (VMS) 418 to provide supplemental power to the rotorcraft. The process 470 may begin at block 472 where the Vehicle Management System (VMS) 418 may receive a command to provide supplemental power to the rotor/drive system 410. This command may originate from the Flight Control Computer (FCC) 420 in response to a pilot command or a detected condition (e.g., some transient, non-steady-state power required, such as a maneuver or wind gust, etc).

The process 470 may proceed to block 474 where the Vehicle Management System (VMS) 418 communicates with vehicle Health and Usage Monitoring System (HUMS) 422 to determine if there are any system components or conditions that may interfere with the process. At block 476, the Vehicle Management System (VMS) 418 may also detect status of the system components, such as the internal combustion engine 416 and Torque Slip Clutch 412.

At block 478, the Vehicle Management System (VMS) 418 may command the internal combustion engine 416 to send mechanical power to the rotor/drive system 410 via the torque slip clutch 412, which then augments the power from the gas turbine engines, 402a and 402b.

Figure 5A:
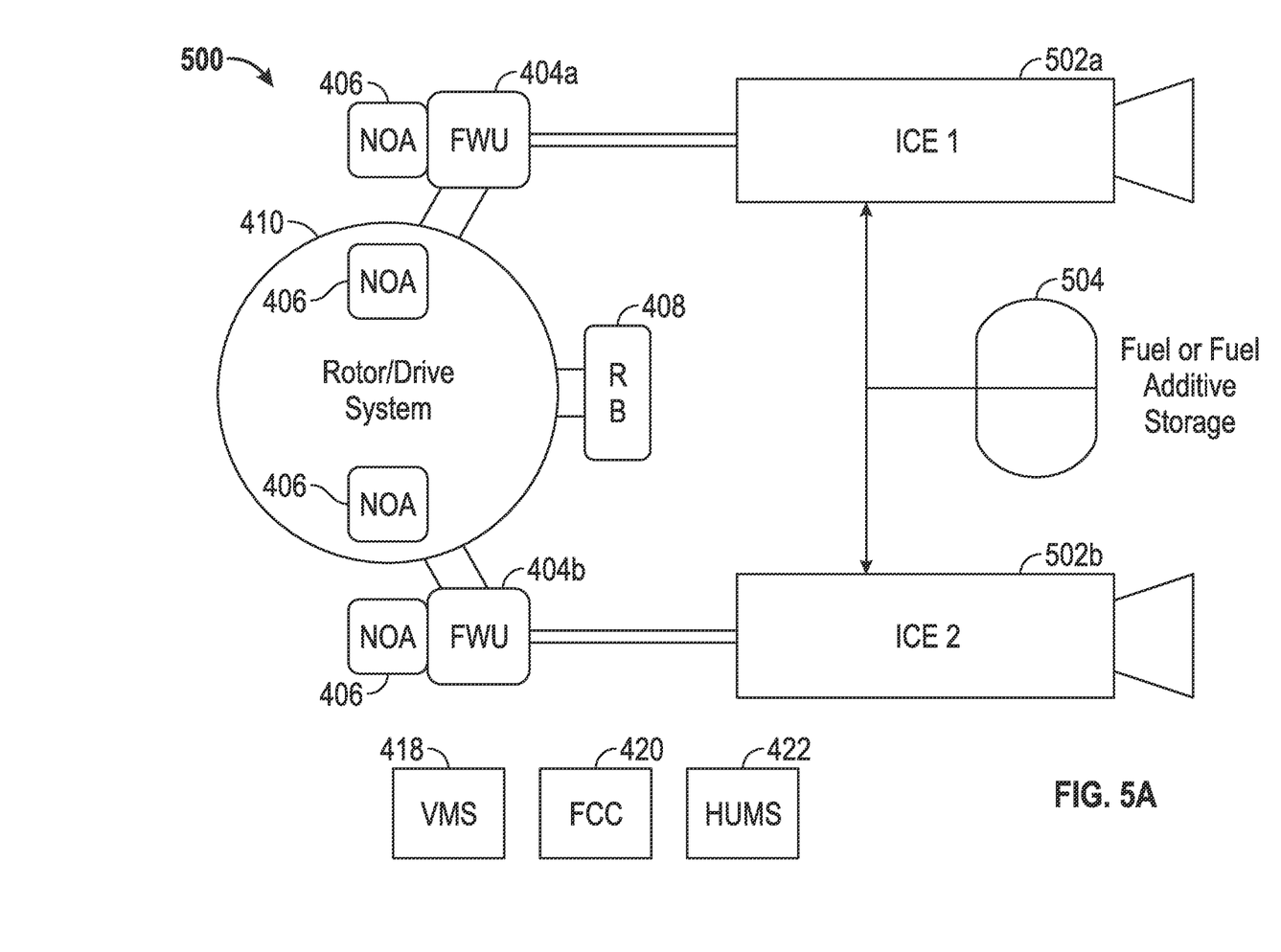
FIG. 5A illustrates an exemplary propulsion system incorporating one or more fuel additives in accordance with one or more embodiments.

FIG. 5A illustrates a system 500 in accordance with one or more embodiments. The system 500 includes many of the same components described above in connection with the system 400, and so a complete re-description is omitted for the sake of brevity. The system 500 may include internal combustion engines 502a and 502b. The internal combustion engines 502a and 502b may correspond to, or be analogous to, the gas turbine engines 302a and 302b of FIG. 3A. The internal combustion engines 502a and 502b may correspond to, or be analogous to, the gas turbine engines 402a and 402b of FIG. 4A. In some embodiments, the internal combustion engines 502a and/or 502b may correspond to a spark ignition (SI) engine or a compression ignition (CI) engine.

During a transient event (e.g., an OEI condition), a secondary system may engage to provide supplemental power. For example, a fuel or fuel additive storage 504 is shown in FIG. 5A. In some embodiments, the fuel or fuel additive storage 504 may be representative of a nitrous oxide (NOS) system, such as when a SI engine is used. In some embodiments, the fuel or fuel additive storage 504 may be representative of a hydrogen system or propane system, such as when a CI engine is used. The NOS, hydrogen, and/or propane systems may serve to increase engine power output. Depending on the size of the boost system, approximately 15-30% additional power may be obtained.

Figure 5B:
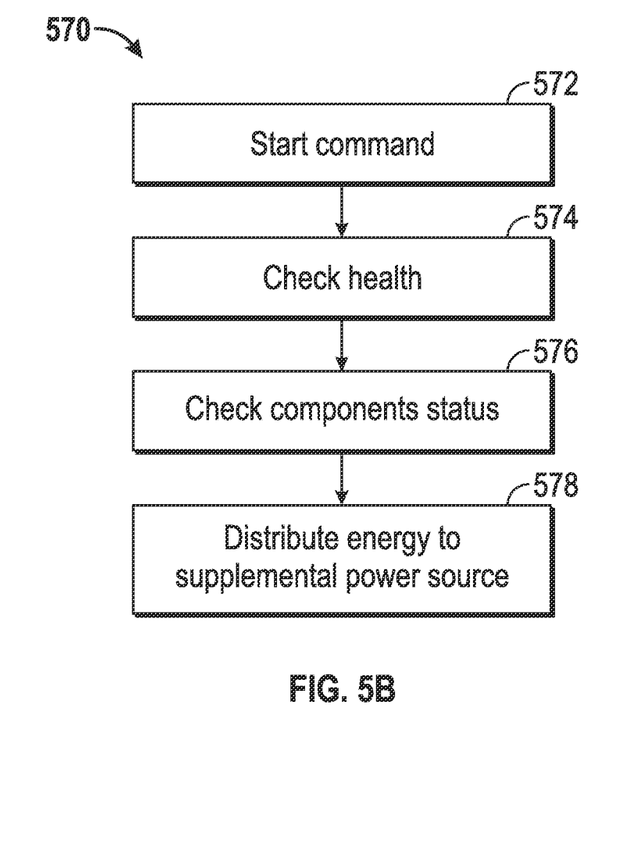
FIG. 5B illustrates a flow chart of an exemplary method in accordance with one or more embodiments.

FIG. 5B is a flowchart of an exemplary process 572 executed by the Vehicle Management System (VMS) 418 to provide supplemental power to the rotorcraft. The process 572 may begin at block 572 where the Vehicle Management System (VMS) 418 may receive a command to provide supplemental power to the rotor/drive system 410. This command may originate from the Flight Control Computer (FCC) 420 in response to a pilot command or a detected condition (e.g., some transient, non-steady-state power required, such as a maneuver or wind gust, etc).

The process 570 may proceed to block 574 where the Vehicle Management System (VMS) 418 communicates with vehicle Health and Usage Monitoring System (HUMS) 422 to determine if there are any system components or conditions that may interfere with the process. At block 576, the Vehicle Management System (VMS) 418 may also detect status of the system components, such as internal combustion engines 502a and 502b and Fuel or Fuel Additive Storage 504.

At block 578, the Vehicle Management System (VMS) 418 may command the Fuel or Fuel Additive Storage 504 to send chemical energy to the internal combustion engines 502a and 502b, which then augments the power from the internal combustion engines, 502a and 502b.

Figure 6:
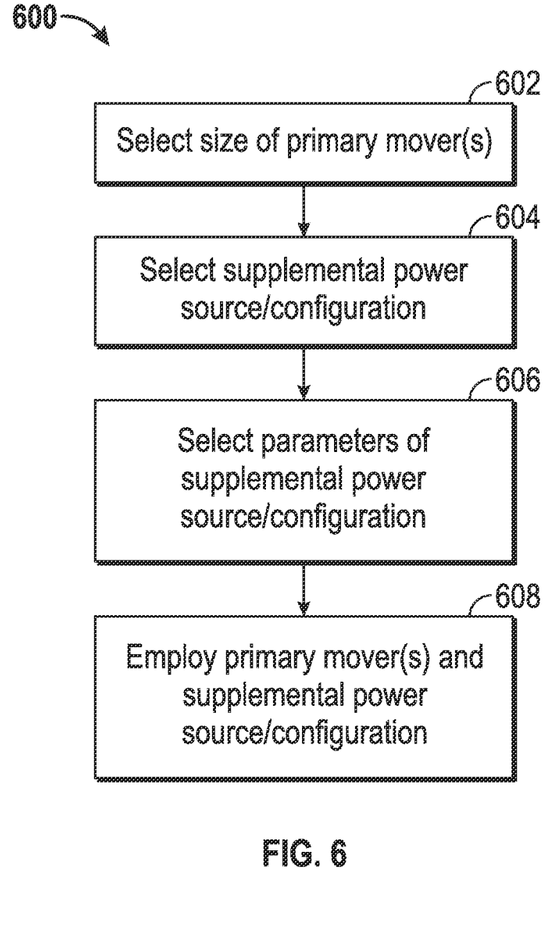
FIG. 6 illustrates a flow chart of an exemplary method in accordance with one or more embodiments.

FIG. 6 illustrates a method 600 that may be used in connection with one or more entities, devices or systems, such as those described herein. The method 600 may be used to provide for power management in one or more applications or environments, such as an aircraft environment.

In block 602, a size of one or more primary movers (e.g., one or more turbines) may be selected. The size of the primary mover(s) may be selected for so-called normal or conventional uses, or to satisfy a baseline power requirement for operation. For example, in the context of an aircraft application or environment, a size of the primary mover(s) may be selected to support optimal fuel efficiency or performance during cruise. Some additional margin may be built-in to provide for safety or reliability.

In block 604, one or more supplemental power sources or configurations may be selected. For example, supplemental power may be provided via an electrical power system (e.g., FIG. 3A), a(n additional) heat engine (e.g., FIG. 4A), or one or more fuel supplements or additives (e.g., FIG. 5A).

In block 606, one or more parameters may be selected for the selected supplemental power source/configuration of block 604. For example, a size, capacity, or amount of the supplemental power source may be selected to ensure that a sufficient total power is available to handle transient loads or conditions, such as an OEI condition.

In block 608, the primary mover(s) and the supplemental power source(s) may be employed in accordance with the selections of blocks 602-606.

The method 600 is illustrative. In some embodiments, one or more of the blocks or operations (or portions thereof) may be optional. In some embodiments, additional operations not shown may be included. In some embodiments, the operations may execute in an order or sequence different from what is shown.

Embodiments of the disclosure may be tied to one or more particular machines. For example, one or more devices, apparatuses, systems, or architectures may be configured to provide supplemental power in response to transient loads, which may be a result of an OEI condition with respect to a primary mover.

Embodiments of the disclosure may provide for a reduction in aircraft weight, which may result in an increase in efficiency of the aircraft. Use of a smaller primary mover or engine may result in a weight reduction of the primary mover, which may improve fuel efficiency. A smaller mover/engine may have less exhaust mass and drag, thereby providing for lower emissions. Airframe systems (e.g., fire suppression, engine compartment, mounts, inlet, and exhaust) may exhibit a corresponding decrease in size. Aircraft life may be enhanced or extended.

Exemplary embodiments of this disclosure have been described in connection with aircraft environments and applications. Aspects of this disclosure may be implemented in other environments and applications, such as marine applications (e.g., boats, ships, etc.), terrestrial applications (e.g., automobile applications), etc.

As described herein, in some embodiments various functions or acts may take place at a given location and/or in connection with the operation of one or more apparatuses, systems, or devices. For example, in some embodiments, a portion of a given function or act may be performed at a first device or location, and the remainder of the function or act may be performed at one or more additional devices or locations.

Embodiments may be implemented using one or more technologies. In some embodiments, an apparatus or system may include one or more processors, and memory storing instructions that, when executed by the one or more processors, cause the apparatus or system to perform one or more methodological acts as described herein. Various mechanical components known to those of skill in the art may be used in some embodiments.

Embodiments may be implemented as one or more apparatuses, systems, and/or methods. In some embodiments, instructions may be stored on one or more computer-readable media, such as a transitory and/or non-transitory computer-readable medium. The instructions, when executed, may cause an entity (e.g., an apparatus or system) to perform one or more methodological acts as described herein.

Aspects of the disclosure have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional.

What is claimed is:

1. A system comprising:
   a plurality of thermal engines configured to serve as primary movers of at least one rotor associated with an aircraft, wherein a size of the thermal engines are selected to provide a baseline power that satisfies a baseline power requirement for operation of the aircraft during a steady state load condition;
   a motor-generator, wherein during a transient load condition, each of the plurality of thermal engines is operational and the motor generator is configured to supplement the baseline power provided by the plurality of thermal engines to conditionally drive the at least one rotor; and
   a power processing unit configured to cause a battery to provide electrical power to the motor-generator during the transient load condition and to charge the battery during the steady state load condition, wherein during at least one mode of operation of the system, both the plurality of thermal engines and the motor-generator drive the at least one rotor,
   wherein the power processing unit comprises a motor drive having an AC-DC inverter, the motor drive electrically connecting the battery to the motor-generator, and
   wherein the baseline power requirement is selected in accordance with a net positive energy depletion (NPED) technique such that a capacity of the battery at completion of a mission is less than at start of the mission.

2. The system of claim 1, wherein the battery is configured to be charged during the steady state load condition via the motor-generator.

3. The system of claim 1, wherein the power processing unit is configured to cause the battery to provide electrical power to an aircraft electrical load.

4. The system of claim 3, wherein the aircraft electrical load comprises a fault isolation mechanism to ensure that the battery is able to provide electrical power to the motor-generator.

5. The system of claim 1, wherein during an inoperability of one of the plurality of thermal engines, an operable engine of the plurality of thermal engines and the motor-generator drive the at least one rotor.

6. The system of claim 1, wherein the plurality of thermal engines are sized to provide a power capacity to satisfy a cruise condition of the aircraft.

7. A system comprising:
   a plurality of thermal engines configured to serve as primary movers of at least one rotor associated with an aircraft, wherein a size of the thermal engines are selected to provide a baseline power that satisfies a baseline power requirement for operation of the aircraft during a steady state load condition;
   a motor-generator, wherein during a transient load condition, each of the plurality of thermal engines is operational and the motor generator is configured to supplement the baseline power provided by the plurality of thermal engines to conditionally drive the at least one rotor; and
   a power processing unit configured to cause a battery to provide electrical power to the motor-generator during the transient load condition and to charge the battery during the steady state load condition, wherein during at least one mode of operation of the system, both the plurality of thermal engines and the motor-generator drive the at least one rotor,
   wherein the power processing unit comprises a motor drive having an AC-DC inverter, the motor drive electrically connecting the battery to the motor-generator, and
   wherein the baseline power requirement is selected in accordance with a net zero energy depletion (NZED) technique such that the battery experiences no net change in energy depletion over duration of a mission.

8. The system of claim 7, wherein during an inoperability of one of the plurality of thermal engines, an operable engine of the plurality of thermal engines and the motor-generator drive the at least one rotor.

9. The system of claim 7, wherein the plurality of thermal engines are sized to provide a power capacity to satisfy a cruise condition of the aircraft.

10. The system of claim 7, wherein the battery is configured to be charged during the steady state load condition via the motor-generator.

11. The system of claim 7, wherein the power processing unit is configured to cause the battery to provide electrical power to an aircraft electrical load.

12. The system of claim 11, wherein the aircraft electrical load comprises a fault isolation mechanism to ensure that the battery is able to provide electrical power to the motor-generator.

13. A system comprising:
a plurality of thermal engines configured to serve as primary movers of at least one rotor associated with an aircraft, wherein a size of the thermal engines are selected to provide a baseline power that satisfies a baseline power requirement for operation of the aircraft during a steady state load condition;
a motor-generator, wherein during a transient load condition, each of the plurality of thermal engines is operational and the motor generator is configured to supplement the baseline power provided by the plurality of thermal engines to conditionally drive the at least one rotor; and
a power processing unit configured to cause a battery to provide electrical power to the motor-generator during the transient load condition and to charge the battery during the steady state load condition, wherein during at least one mode of operation of the system, both the plurality of thermal engines and the motor-generator drive the at least one rotor,
wherein the power processing unit comprises a motor drive having an AC-DC inverter, the motor drive electrically connecting the battery to the motor-generator, and
wherein the baseline power requirement is selected in accordance with a net negative energy depletion (NNED) technique, such that a capacity of the battery at completion of a mission is greater than at start of the mission.

14. The system of claim 13, wherein the battery is configured to be charged during the steady state load condition via the motor-generator.

15. The system of claim 13, wherein the power processing unit is configured to cause the battery to provide electrical power to an aircraft electrical load.

16. The system of claim 15, wherein the aircraft electrical load comprises a fault isolation mechanism to ensure that the battery is able to provide electrical power to the motor-generator.

17. The system of claim 13, wherein during an inoperability of one of the plurality of thermal engines, an operable engine of the plurality of thermal engines and the motor-generator drive the at least one rotor.

18. The system of claim 13, wherein the plurality of thermal engines are sized to provide a power capacity to satisfy a cruise condition of the aircraft.

* * * * *